(12) United States Patent
Kajihara et al.

(10) Patent No.: US 6,440,552 B1
(45) Date of Patent: Aug. 27, 2002

(54) BOEHMITE AND BASE COAT LAYER FOR MAGNETIC RECORDING MEDIUM

(75) Inventors: Kazuhisa Kajihara; Yoshiaki Takeuchi, both of Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 186 days.

(21) Appl. No.: 09/649,617

(22) Filed: Aug. 29, 2000

(30) Foreign Application Priority Data

Aug. 30, 1999 (JP) .......................................... 11-243128

(51) Int. Cl.⁷ .............................................. G11B 5/738
(52) U.S. Cl. ........................ 428/323; 428/329; 428/332; 428/694 BS; 428/694 SL; 423/625; 423/629
(58) Field of Search ................... 428/694 BS, 694 SL, 428/323, 329, 332; 423/625, 629

(56) References Cited

U.S. PATENT DOCUMENTS

| | | | |
|---|---|---|---|
| 2,915,475 A | 12/1959 | Bugosh | 252/313 |
| 3,031,417 A * | 4/1962 | Bruce | 252/313 |
| 3,031,418 A * | 4/1962 | Bugosh | 252/313 |
| 3,357,791 A * | 12/1967 | Napier | 23/143 |
| 6,042,937 A * | 3/2000 | Hayashi et al. | 428/323 |
| 6,171,692 B1 * | 1/2001 | Hisano et al. | 428/329 |
| 6,224,846 B1 * | 5/2001 | Hurlburt et al. | 423/625 |

FOREIGN PATENT DOCUMENTS

| | | | |
|---|---|---|---|
| CN | 1266020 | * | 9/2000 |
| JP | 06-262073 | | 9/1994 |
| JP | 06-263436 | * | 9/1994 |
| JP | 10-198948 | | 7/1998 |
| JP | 10-340447 | | 12/1998 |

* cited by examiner

Primary Examiner—Stevan A. Resan
(74) Attorney, Agent, or Firm—Sughrue Mion, PLLC

(57) ABSTRACT

The present invention provide a boehmite in which (i) a crystallite diameter in the direction perpendicular to the plane (020) is about 65 angstrom or longer and (ii) a ratio of a crystallite diameter in the direction perpendicular to the plane (002) to a crystallite diameter in the direction perpendicular to the plane (200) is about 1.8 or more. By using the boehmite as a non-magnetic pigment, a base coat layer for magnetic recording medium having an excellent surface smoothness can be obtained.

7 Claims, No Drawings

BOEHMITE AND BASE COAT LAYER FOR MAGNETIC RECORDING MEDIUM

FIELD OF THE INVENTION

The present invention relates to a boehmite and a base coat layer for magnetic recording medium, which is obtained by using the boehmite.

BACKGROUND OF THE INVENTION

In order to improve high density recording performance of magnetic recording medium such as magnetic tape and running durability thereof, a method has been known in which a base coat layer, that is a non-magnetic layer formed by dispersing a non-magnetic pigment in a binder, is placed between a substrate and a magnetic layer to obtain a magnetic recording medium.

Various proposals have been made for improving a base coat layer. For example, a needle-like iron oxide ($\alpha$-$Fe_2O_3$) has been utilized as a non-magnetic pigment in a base coat layer (as described in JP-A-10-198948).

The base coat layer obtained by using the needlelike iron oxide, however, does not have a satisfactory surface smoothness. As a result, the base coat layer needs a thick magnetic layer to be placed thereon. It is known that a thinner magnetic layer can provide an excellent magnetic recording medium with a lower noise and a higher output than a thick layer. Therefore, a base coat layer having a satisfactory surface smoothness has been demanded.

SUMMARY OF THE INVENTION

Objects of the present invention are to provide a non-magnetic pigment which can provide a base coat layer having an excellent surface smoothness in a magnetic recording medium and to provide a base coat layer for magnetic recording medium which comprises the nonmagnetic pigment.

The present inventors have conducted extensive studies on non-magnetic pigments for base coat layer having an excellent surface smoothness for use in magnetic recording medium. As a result, it has been found that a boehmite (alumina monohydrate) having a specific crystallite diameter can provide a base coat layer having excellent surface smoothness. Thus, the present inventors have completed the present invention.

The present invention provides a boehmite in which (i) a crystallite diameter in the direction perpendicular to the plane (020) is about 65 angstrom or longer and (ii) a ratio of a crystallite diameter in the direction perpendicular to the plane (002) to a crystallite diameter in the direction perpendicular to the plane (200) is about 1.8 or more.

The present invention also provides a base coat layer for magnetic recording medium, which comprises a binder and a boehmite in which (i) a crystallite diameter in the direction perpendicular to the plane (020) is about 65 angstrom or longer and (ii) a ratio of a crystallite diameter in the direction perpendicular to the plane (002) to a crystallite diameter in the direction perpendicular to the plane (200) is about 1.8 or more.

DETAILED DESCRIPTION OF THE INVENTION

A boehmite of the present invention has a crystallite diameter in the direction perpendicular to the plane (020) of about 65 angstrom or longer, preferably about 70 angstrom or longer.

A boehmite of the present invention has a ratio of a crystallite diameter in the direction perpendicular to the plane (002) to a crystallite diameter in the direction perpendicular to the plane (200) of about 1.8 or more, preferably about 2.0 or more.

The crystallite diameter is the value which is measured from an X-ray diffraction of the crystals using the Scherrers's equation(described in Example).

When a crystallite diameter in the direction perpendicular to the plane (020) is less than about 65 angstrom, and/or a ratio of a crystallite diameter in the direction perpendicular to the plane (002) to a crystallite diameter in the direction perpendicular to the plane (200) is less than about 1.8, a base coat layer obtained therefrom does not have excellent surface smoothness.

The boehmite of the present invention may have a sodium content of 100 ppm or less, preferably 50 ppm or less. When the sodium content is more than 100 ppm, a magnetic recording medium which has a base coat layer containing such a boehmite may have a large friction coefficient, or have a lower lubricating or running property due to a reaction between sodium and a lubricant agent when a lubricant agent is contained in the base coat layer.

The boehmite of the present invention may have a BET specific surface area of from 50 $m^2/g$ to 150 $m^2/g$, preferably from 60 $m^2/g$ to 130 $m^2/g$. When the BET specific surface area is larger than 150 $m^2/g$, dispersion of the boehmite in the binder tends to be difficult when a base coat layer is produced using the boehmite.

The boehmite of the present invention may be produced, for example, by a method in which aluminum hydroxide as a raw material is subjected to hydrothermal treatment in an acidic or neutral aqueous solution, a method in which pH of aqueous solution containing aluminum is swung from acidic to alkaline or from alkaline to acidic to crystallize a boehmite (pH-swing method), a method in which aluminum hydroxide is subjected to steam treatment under pressure.

In the following, the method in which aluminum hydroxide is subjected to hydrothermal treatment in an acidic aqueous solution is described in detail.

Aluminum hydroxide as a raw material can be obtained by known methods. Examples thereof include a method in which an aluminum alkoxide is hydrolyzed, a method in which an aluminum salt such as sodium aluminate is neutralized, a method in which an intermediate alumina such as $\rho$-alumina is re-hydrated, a method in which an aluminum salt such as aluminum nitrate is hydrolyzed in supercritical water and the like. Amongst them, the method in which aluminum alkoxide is hydrolyzed can be preferably applied, since the sodium content of the resulting aluminum hydroxide can be reduced.

Examples of the acidic aqueous solution utilized for the hydrothermal treatment of aluminum hydroxide include an aqueous solution of organic acid such as acetic acid, and an aqueous solution of inorganic acid such as hydrochloric acid. An organic acid such as acetic acid is preferably utilized, since corrosion of apparatus can be prevented. The concentration of acid in the acidic aqueous solution may be about 0.1% by weight or more, preferably from about 0.5% by weight to about 10% by weight, more preferably from about 1% by weight to about 8% by weight.

The hydrothermal treatment may be effected by placing an acidic aqueous solution and aluminum hydroxide (in an amount such that the concentration of aluminum hydroxide falls within a range of from about 2% by weight to about 32% by weight based on the acidic aqueous solution) in a pressure vessel equipped with a stirrer and heating, followed by heating. The crystallite diameter may vary depending on concentration of acid in the acidic solution, temperature for treatment, and period of time for treatment and, therefore, these conditions are adjusted so that the resulting boehmite has a desired crystallite diameter in the direction perpendicular to the plane (020) and a ratio of a crystallite diameter in the direction perpendicular to the plane (002) to a crystallite diameter in the direction perpendicular to the plane (200).

For example, the hydrothermal treatment may be carried out at the temperature of from about 150° C. or more, preferably from about 180° C. to about 230° C. in acidic aqueous solution in which the concentration of acid is from about 1% by weight to about 8% by weight. The time of the hydrothermal treatment become shorter as the temperature become higher. It is not preferable to carry out the hydrothermal treatment at the temperature of about 230° C. or more because an apparatus for the treatment becomes more expensive. It requires the time of about 3 hours or more to carry out the hydrothermal treatment at the temperature of less than about 180° C. The time of the hydrothermal treatment is usually selected from the range of about 0.5 hours to about 6 hours.

When the hydrothermal treatment is carried out at a higher temperature and/or for a longer period of time, the crystallite diameter tends to be greater.

After the hydrothermal treatment, the resulting boehmite may be collected from the hydrothermal treatment solution, washed with water (if needed in order to remove acidic component or the like in the solution), and dried. The drying may be carried out preferably by spray-drying, flash-drying or the like, since aggregation of crystals during drying tends to be prevented with such a drying. It is preferred that the obtained boehmite has a water content of 5% or less, which is measured by weight loss of boehmite on heating at 110° C.

The boehmite of the present invention is preferably utilized in a base coat layer for magnetic recording media. The base coat layer, that is a non-magnetic layer, may be obtained by dispersing the boehmite in a binder and placing the resulting mixture onto at least one surface of a substrate.

Examples of the substrate include a film of synthetic resin such as polyethylene terephthalate, polyethylene, polypropylene, polycarbonate, polyethylene naphthalate, polyamide, polyimideamide or polyimide, a film of metal such as aluminum or stainless steel, paper and others.

Examples of the binder to be utilized in the base coat layer include vinyl chloride-vinyl acetate copolymer, urethane resins, butadiene-acrylonitrile copolymer, polyvinyl butyral, cellulose derivatives such as nitrocellulose, polyester resins, synthetic rubber resins such as polybutadiene, epoxy resins, polyamide resins, electron-beam-curable acryl-urethane resins and the like. The binder may have a polar group such as —OH, —COOH, —SO$_3$H, —OPO$_3$H$_2$, —NH$_2$ or the like.

There is no limitation on a method for producing the base coat layer as long as a boehmite therein can be dispersed in a binder and the resulting mixture can be placed as a layer onto at least one surface of a substrate. Examples of the method include a method in which a solvent, a boehmite and a binder are placed and mixed in a vessel equipped with an agitating means to prepare a coationg mixture is applied onto a surface of a substrate by a doctor blade method or the like so that the thickness of the resulting base coat layer is as uniform as possible and then the layer is dried.

The base coat layers, that are non-magnetic layers, may be placed on both sides of the substrate. In this case, the coating and/or drying of the coating mixture may be conducted on both sides at once. Components(such as a solvent, a boehmite and a binder) in the coating mixture may be the same on both sides or may be different on each side.

The coating mixture of the present invention may contain a lubricating agent, an abrasive agent, an antistatic agent or the like, insofar as the excellent properties of the coating layer in the present invention are not deteriorated. Examples of the lubricating agent include fatty acid, fatty acid esters and the like. Examples of the abrasive agent include alumina, chromium oxide and the like. Examples of the antistatic agent include surfactants, carbon black and the like.

By using a base coat layer of the invention, a magnetic recording medium having excellent electronic-magnetic conversion properties can be obtained. The magnetic recording medium may be produced by, for example, a method in which a mixture containing magnetic powders, a binder resin and, if necessary, a lubricating agent, a abrasive agent, an antistatic agent and the like is applied onto a surface of the base coat layer placed on the substrate, followed by being subjected to a magnetic orientation treatment, being dried and treated by calendar.

As described above in detail, a base coat layer (for magnetic recording medium) having an excellent surface smoothness can be obtained by using a boehmite of the invention as a non-magnetic pigment in the magnetic recording medium. By using the base coat layer of the invention, a thinner magnetic layer can be formed in a magnetic recording medium and, therefore, the magnetic layer can provide excellent properties with a lower noise and a higher output.

EXAMPLES

The boehmite and the base coat layer for magnetic recording media of the present invention are described in more detail with reference to Examples. The Examples should not be construed as a limitation upon the scope of the invention.

Crystallite diameter and surface smoothness were measured by the following processes:
(1) Crystallite diameter of boehmite:

An X-ray diffraction profile of boehmite was obtained. Then, a fitting process was conducted between peaks in the profile and peaks for planes (020), (200) and (002) to obtain a half width of each peak corresponding to each plane. The crystallite diameter was calculated by the following Scherrer's equation using the half width and peak position obtained by center-of-mass method.

$$D = K \times \gamma/(\beta \times \cos\theta)$$

D: crystallite diameter
K: Scherrer's constant(0.94)
λ: wavelength(CuKα ray: 1.5406 Å)
β: half width(radian)
θ: peak position(radian)
Conditions for the measurement of X-ray diffraction are shown below.
Apparatus: Rint-2100, manufactured by Rigaku Co., Ltd.
Target: Cu target
Voltage×Current: 40 kV×40 mA
Slit: DS1°-SS1°-RSO0.3 mm
Scan speed: 2°/minute
Scan step: 0.01°/step
Scanning range: 2–70°

The calculation for crystallite diameter in the direction perpendicular to the plane (002) was conducted with separation of the peak thereof from a neighboring peak of the plane (231). The calculation for crystallite diameter in the direction perpendicular to the plane (200) was conducted without separation of the peak thereof from a neighboring peak of the plane (051), since it was difficult to separate them.

(2) Surface smoothness of base coat layer:

With JIS-Z8741 method, a relative specular gloss of base coat layer to that of glass having a refractive index of 1.567 was measured, that the specular gloss of glass is regarded as 100. The measurements were conducted so that the angle of incident light and reflective light were adjusted to 45° to the direction of a longer side of the base coat layer. A larger relative specular gloss of layer means that the surface smoothness of the layer is better.

Example 1

Aluminum hydroxide having a crystallite diameter of 33 angstrom in the direction perpendicular to the plane (020), which was obtained by hydrolyzing an aluminum alkoxide, was subjected to hydrothermal treatment at 180° C. for 6 hours in 8% by weight of aqueous acetic acid solution. Then, the resulting product was dried with a spray-drier to obtain a boehmite having a Na content of 44 ppm.

The BET specific area and the crystalline diameters perpendicular to the planes (020), (200) and (002) of the obtained boehmite are shown in Table 1.

A mixture of 15 parts by weight of the obtained boehmite, 5 parts by weight of a vinyl chloride resin (commercial name: MR 110, manufactured by Nippon Geon Co., Ltd.), 49 parts by weight of methyl ethyl ketone (reagent grade, manufactured by Wako Pure Chemicals Ind., Ltd.) and 21 parts by weight of toluene (reagent grade, manufactured by Wako Pure Chemicals Ind., Ltd.) was dispersed for 4 hours with a ⅛-batch-system sand grinder (medium: 2 mm glass beads, rotation: 2,000 rpm) to prepare a coating mixture. Then, the coating mixture was applied onto a substrate (polyethylene terephthalate film having a thickness of 14 μm) using a doctor blade at a thickness of 45 μm and dried to obtain a base coat layer.

The relative specular gloss of the base coat layer is shown in Table 1.

Example 2

The same procedure as in Example 1 was conducted except that the hydrothermal treatment was carried out at 220° C. for 6 hours in 0.8% by weight of aqueous acetic acid solution to obtain a boehmite and a base coat layer.

The BET specific area and the crystalline diameters perpendicular to the planes (020), (200) and (002) of the obtained boehmite, and the relative specular gloss of the obtained base coat layer are shown in Table 1.

Comparative Example 1

Aluminum hydroxide having a crystallite diameter of 28 angstrom in the direction perpendicular to the plane (020), which was obtained by hydrolyzing an aluminum alkoxide, was subjected to hydrothermal treatment at 180° C. for 3 hours in 8% by weight of aqueous acetic acid solution. Then, the resulting product was dried with a spray-drier to obtain a boehmite.

The BET specific area and the crystalline diameters perpendicular to the planes (020), (200) and (002) of the obtained boehmite are shown in Table 1.

Comparative Example 2

The same procedure as in Comparative Example 1 was conducted except that the hydrothermal treatment was carried out at 200° C. for 6 hours in 0.8% by weight of aqueous acetic acid solution to obtain a boehmite and a base coat layer.

The BET specific area and the crystalline diameters perpendicular to the planes (020), (200) and (002) of the obtained boehmite, and the relative specular gloss of the obtained base coat layer are shown in Table 1.

Comparative Example 3

The same procedure as in Example 1 was conducted except that 15 parts by weight of needle-like iron oxide having a BET specific surface area of 51 m²/g, which was obtained by the method described in JP-A-1-54321, was used in place of 15 parts by weight of the boehmite to obtain a base coat layer.

The relative specular gloss of the obtained base coat layer is shown in Table 1.

TABLE 1

| | BET specific surface area (m²/g) | Crystallite diameter (Å) perpendicular to plane (020) | Crystallite diameter (Å) perpendicular to plane (200) (diameter B) | Crystallite diameter (Å) perpendicular to plane (002) (diameter A) | Ratio of crystallite diameters (diameter A/ diameter B) | Relative specular gloss of base coat layer |
|---|---|---|---|---|---|---|
| Example 1 | 79 | 99 | 103 | 235 | 2.3 | 155 |
| Example 2 | 64 | 138 | 112 | 262 | 2.3 | 146 |
| Comparative example 1 | 129 | 58 | 100 | 209 | 2.1 | 125 |
| Comparative example 2 | 90 | 66 | 129 | 208 | 1.6 | 73 |
| Comparative example 3 | 51 | — | — | — | — | 128 |

What is claimed is:

1. A boehmite in which (i) a crystallite diameter in the direction perpendicular to the plane (020) is about 65 angstrom or longer and (ii) a ratio of a crystallite diameter in the direction perpendicular to the plane (002) to a crystallite diameter in the direction perpendicular to the plane (200) is about 1.8 or more.

2. The boehmite according to claim 1, wherein said boehmite has a sodium content of 100 ppm or less.

3. The boehmite according to claim 1 or 2, wherein said boehmite has a BET specific surface area of from 50 m$^2$/g to 150 m$^2$/g.

4. A base coat layer for magnetic recording medium, which comprises a binder and a boehmite in which (i) a crystallite diameter in the direction perpendicular to the plane (020) is about 65 angstrom or longer and (ii) a ratio of a crystallite diameter in the direction perpendicular to the plane (002) to a crystallite diameter in the direction perpendicular to the plane (200) is about 1.8 or more.

5. The base coat layer according to claim 4, wherein said boehmite has a Na content of 100 ppm or less.

6. The base coat layer according to claim 4, wherein said boehmite has a BET specific surface area of from 50 m$^2$/g to 150 m$^2$/g.

7. The base coat layer according to claim 4, wherein said binder is at least one resin selected from the group consisting of chloride-vinyl acetate copolymer, urethane resins, butadiene-acrylonitrile copolymer, polyvinyl butyral, cellulose derivatives, polyester resins, synthetic rubber resins, epoxy resins, polyamide resins, electron-beam-curable acryl-urethane resins.

* * * * *